Nov. 4, 1958 S. P. COMPTON ET AL 2,858,669
THRUST REVERSING DEVICE FOR JET ENGINES
Filed Sept. 15, 1953 2 Sheets-Sheet 1

INVENTORS.
STANLEY P. COMPTON
FRED W. MUSTERER
BY
Knox & Knox
AGENTS FOR APPLICANTS INVENTORS.
STANLEY P. COMPTON
FRED W. MUSTERER
BY
Knox & Knox
AGENTS FOR APPLICANTS

United States Patent Office 2,858,669
Patented Nov. 4, 1958

2,858,669

THRUST REVERSING DEVICE FOR JET ENGINES

Stanley P. Compton, San Diego, and Fred W. Musterer, Solana Beach, Calif., assignors to The Ryan Aeronautical Co., San Diego, Calif., a corporation of California Application September 15, 1953, Serial No. 380,224

4 Claims. (Cl. 60—35.54)

The present invention relates generally to jet engines and more particularly to a thrust reversing device for jet engines.

The primary object of this invention is to provide a means for temporarily reversing the thrust of a jet engine to obtain a braking effect on an aircraft when landing in confined areas.

Another object of this invention is to provide a thrust reversing device which is contained within the jet engine and which does not interfere with the normal operation of the engine.

Another object of this invention is to provide a thrust reversing device which may be actuated at the option of the pilot.

Another object of this invention is to provide a thrust reversing device which may be quickly returned to the inoperative or normal thrust position, so that the full thrust may be used for emergency take-off in the event of an unsuccessful landing attempt.

Another object of this invention is to provide a thrust reversing device which may be fitted to many types of jet engines and aircraft with a minimum of structural modification.

Finally, it is an object to provide a thrust reversing device of the aforementioned character which is simple, safe and convenient to operate, and which will give generally efficient and durable service.

With these and other objects definitely in view, this invention consists in the novel construction, combination and arrangement of elements and portions as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Figure 1:
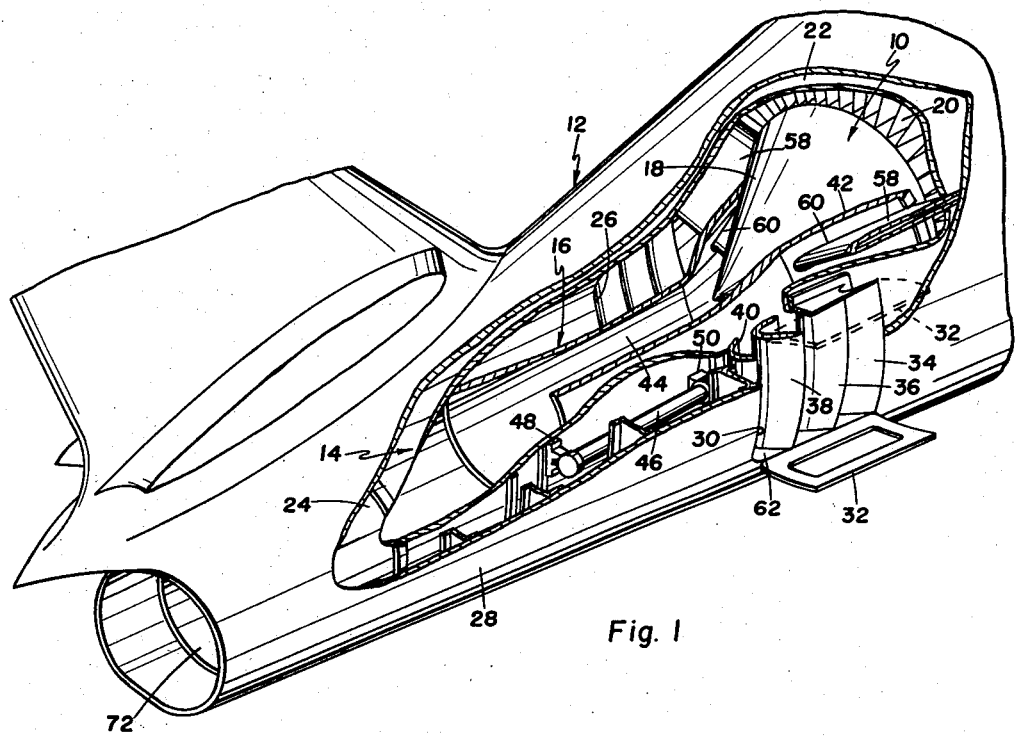
Fig. 1 is a cutaway perspective view of the rear fuselage of a jet aircraft showing the exhaust diverter in the reversed thrust position.

Referring now to the drawings, the device is attached to a jet engine generally designated by the numeral 10, the engine being installed in the rear fuselage 12 of a conventional jet aircraft. Within the tail pipe 14 of the jet engine 10 is an axially movable diverter cone 16 which, in the forward and operative position, seats against the inner cone 18 of the jet engine immediately aft of the turbine 20.

The tail pipe 14 includes an outer cone 22, tapering from the full diameter of the turbine 20 to the smaller diameter of the tail pipe extension 24. At the junction of the outer cone 22 and the extension 24, said outer cone is provided with a pair of opposed openings 26. The fuselage shell 28 is also provided with a pair of openings 30, which are each covered by a pair of hinged doors 32 and are generally in alignment with the openings 26. Between the openings 30 and 26 at each side of the fuselage are a plurality of deflector vanes 34, 36, 38 and 40 respectively, from front to rear.

The airframe structure illustrated in the drawings is typical of conventional jet aircraft and need not be described in detail herein.

Figure 3:
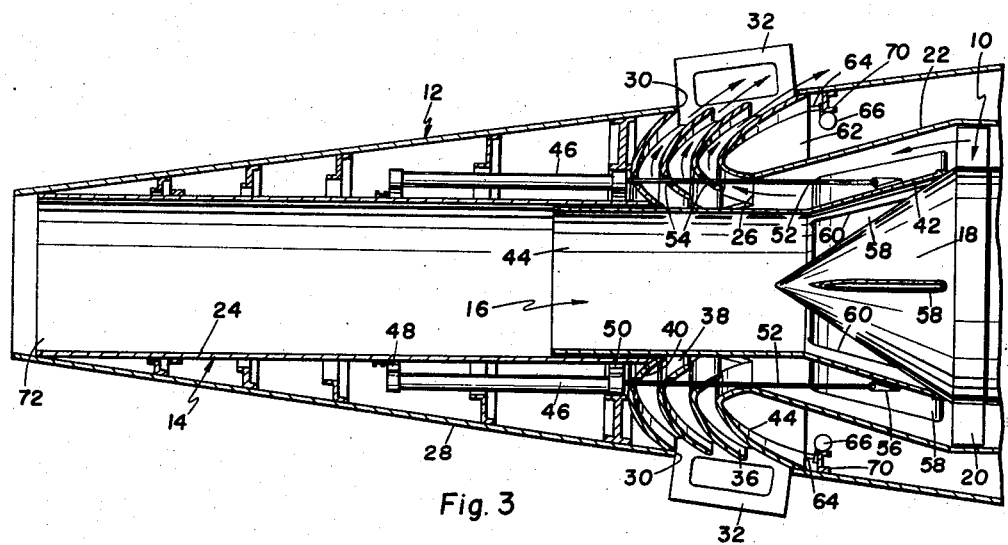
Fig. 3 is a sectional view taken on the line 3—3 of Fig. 2.

The diverter cone 16 comprises a frusto-conical throat portion 42 from which extends a tail portion 44. The throat portion 42 is tapered to fit substantially flush against the inner surface of the outer cone 22, while the tail portion 44 is a smooth sliding fit within the tail pipe extension 24. The diverter cone 16 is moved axially in the tail pipe 14 by any suitable means illustrated herein as fluid-actuated jacks 46 which are mounted on the outside of the extension 24 on suitable brackets 48 and 50. The push rods 52 extending from the jacks 46, pass through the vanes 36, 38 and 40 by way of suitable apertures 54, and are attached to brackets 56 on the throat portion 42. Since in many types of jet engines, the inner cone 18 is supported by a plurality of radial struts 58, the throat portion 42 is illustrated as having slots 60 to fit around said struts when in the forward position as shown in Figs. 1 and 3.

The upper and lower ends of the vanes 34 to 40 are enclosed by cover plates 62 to provide ducts through the fuselage shell 28 to the outside of the aircraft. The vanes 34 to 40 are shaped to divert the flow of exhaust gases from a normally rearward direction and to eject the gases generally forwardly from the openings 30. The actual shape of the vanes 34 to 40 may be determined aerodynamically to suit the particular flow characteristics of the jet engine exhaust.

Figure 5:
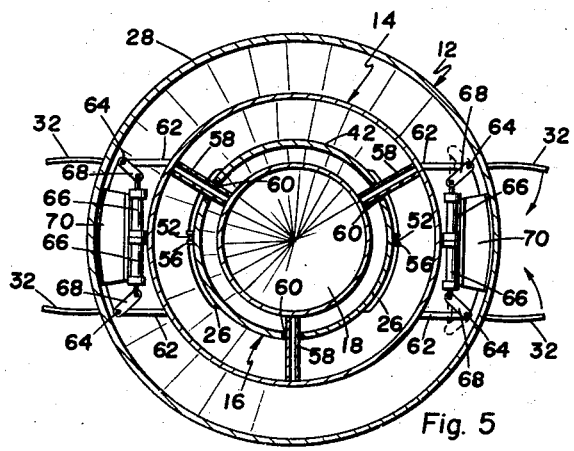
Fig. 5 is a sectional view taken on the line 5—5 of Fig. 2.

The doors 32 are mounted on hinge rods 64 at the upper and lower edges of the openings 30, said doors opening outwardly from the fuselage as shown in Fig. 5. The doors are opened and closed by means of fluid actuated jacks 66 which are connected to levers 68 attached to the hinge rods 64. The jacks 66 are mounted on a suitable brackets 70 secured to the fuselage shell. The jacks 66 are operatively interconnected to the jacks 46 so that the doors 32 open as the diverter cone 16 moves forwardly and closes as said diverter cone moves rearwardly.

It will be evident that the various structural components in the path of the exhaust gases must be constructed of heat resistant materials, the design of such structure being well understood by those skilled in the art.

Figure 4:
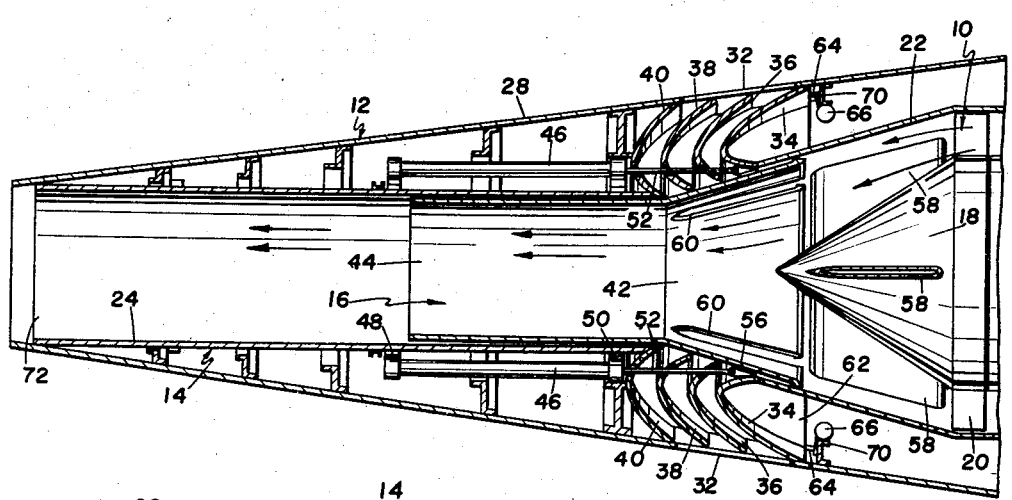
Fig. 4 is a sectional view similar to Fig. 3 but showing the exhaust diverter in the normal thrust position.

With the thrust reversing device in its non-operative position as shown in Fig. 4, the diverter cone 16 is at its aft position in close contact with the tail pipe 14, and the doors 32 are closed. Thus the openings 26 are sealed off and the exhaust gases from the jet engine are permitted to follow their normal path through the tail pipe 14, as shown by the arrows, and emerge from the outlet 72 as a propulsive thrust.

When a reverse thrust is required to decelerate the aircraft, as when landing in a restricted space, the diverter cone 16 is moved forwardly so that the forward edge 74 of the throat portion 42 seats firmly against the inner cone 18. At the same time, the doors 32 are opened. The exhaust gases are now restricted to the annulus between the throat portion 42 and the outer cone 22, and are prevented from entering the tail pipe extension 24 by the tail portion 44 of the diverter cone, which is still engaged therewith as shown in Fig. 3. The only escape for the exhaust gases is through the openings 26 and between the vanes 34 to 40 as shown by the arrows. The exhaust gases emerge from the openings 30 in a forwardly direction and so provide the necessary braking or reverse thrust. This reverse thrust is also useful in combat maneuvers, the sudden deceleration allowing the aircraft to turn more sharply with obvious advantage.

During the present landing procedure of jet aircraft, it is customary for the engine to be kept running at 50% thrust or higher due to the relatively slow acceleration of a jet engine to full speed. Thus, in the event of an emergency such as overshooting the airfield, sufficient thrust is available to enable the aircraft to climb for a further attempt. By using the thrust reversing device described herein, the aircraft may be decelerated more rapidly with the engine revolutions at a high level, so that a relatively high engine speed is actually beneficial for landing. In the event of an emergency, the diverter cone is quickly returned to the aft position, thus allowing the full thrust of the engine to be immediately available.

While the device is operative as drawn and described, it should be understood that the arrangement is illustrative only, the specific structural details being determined by development to suit particular types of engines and aircraft. Further, although the device has been shown installed in the rear fuselage of a fighter type aircraft, the invention is equally suitable for engines in nacelle type installations. It is also noteworthy that the number and relative size of the openings 22 may be varied considerably without departure from the spirit of this invention or beyond the broad teaching in this disclosure.

Figure 2:
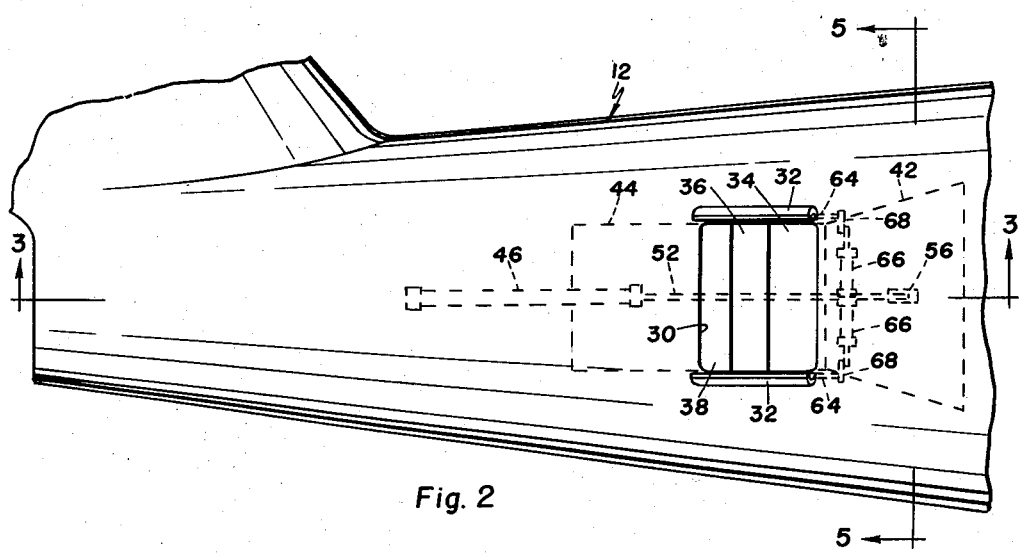
Fig. 2 is a fragmentary side elevation view of the rear fuselage showing the relative locations of the exhaust diverter components.

In recapitulation, the basic components of the thrust reversing device include an axially movable diverter cone which seals off the tail pipe of the jet engine, so that the exhaust gases are diverted through lateral openings and between vanes which direct the gases forwardly and outwardly from the aircraft. The general arrangement of these essential components is illustrated in Fig. 2.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

We claim:

1. In combination, a jet engine having a tail pipe comprising an outer cone, a concentric inner cone and an extension pipe continuing from said outer cone, and a thrust reversing device comprising a diverter cone axially slidable in said tail pipe, said outer cone having lateral openings, a plurality of vanes in each of said openings, said diverter cone seating on said inner cone when in the forward position and effectively blocking said tail pipe, so that exhaust gases are directed through said openings, and said diverter cone covering said openings when in the aft position, said vanes being shaped to direct the gases forwardly therefrom, and hinged doors selectively covering said openings.

2. In combination, a jet engine having a tail pipe comprising an outer cone, a concentric inner cone and an extension pipe continuing from said outer cone, and a thrust reversing device comprising a diverter cone axially slidable in said tail pipe, remote control means for moving said diverter cone selectively forward and aft, said outer cone having lateral openings, a plurality of vanes in each of said openings, said diverter cone seating on said inner cone when in the forward position and effectively blocking said tail pipe, so that exhaust gases are directed through said openings, and said diverter cone covering said openings when in the aft position, said vanes being shaped to direct the gases forwardly therefrom, and hinged doors selectively covering said openings.

3. In combination, a jet engine having a tail pipe comprising an outer cone, a concentric inner core and an extension pipe continuing from said outer cone, and a thrust reversing device comprising a diverter cone axially slidable in said tail pipe, remote control means for moving said diverter cone selectively forward and aft, said outer cone having lateral openings, a plurality of vanes in each of said openings, said diverter cone seating on said inner cone when in the forward position and effectively blocking said tail pipe, so that exhaust gases are directed through said openings, and said diverter cone covering said openings when in the aft position, said vanes being shaped to direct the gases forwardly therefrom, hinged doors selectively covering said openings, and means for opening said doors when said diverter cone is in the forward position.

4. In combination, a jet engine installed in an aircraft, said jet engine having a tail pipe comprising an outer cone, a concentric inner cone and an extension pipe continuing from said outer cone, a turbine exhausting between said inner and outer cones, and a thrust reversing device comprising a diverter cone axially slidable in said tail pipe, pilot controlled actuating means for moving said diverter cone selectively forward and aft, opposed openings in said outer cone and corresponding outlets in the surrounding structure of the aircraft, a plurality of vanes in each of said openings, said diverter cone having a tapered throat portion and a tail portion, said throat portion being substantially flush with said outer cone and covering said openings when in the aft position, said throat portion seating on said inner cone and said tail portion effectively blocking said tail pipe when in the forward position, so that exhaust gases are directed through said openings, said vanes being shaped to direct the gases forwardly through said outlets, hinged doors covering said outlets and means for opening said doors simultaneously when said diverter cone is moved to the forward position.

References Cited in the file of this patent

UNITED STATES PATENTS

| | | |
|---|---|---|
| 2,510,506 | Lindhagen et al. | June 6, 1950 |
| 2,637,164 | Robson et al. | May 5, 1953 |